Sept. 14, 1937.  J. NELSON  2,093,362
COVER FOR SHIPS' HATCHES
Filed May 27, 1936  8 Sheets-Sheet 1
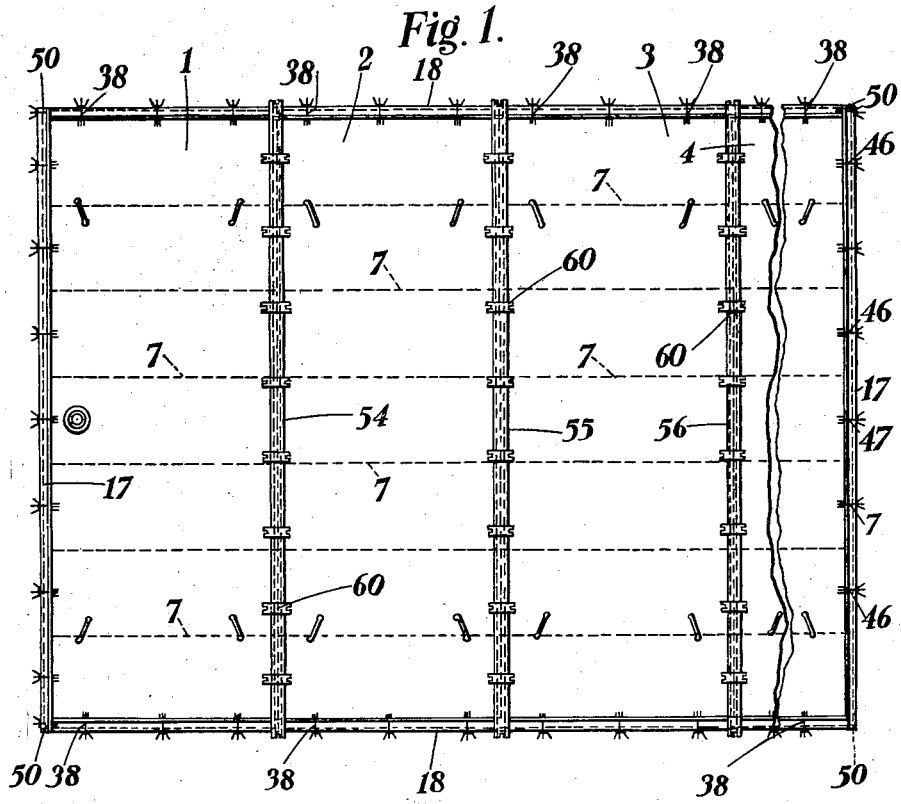
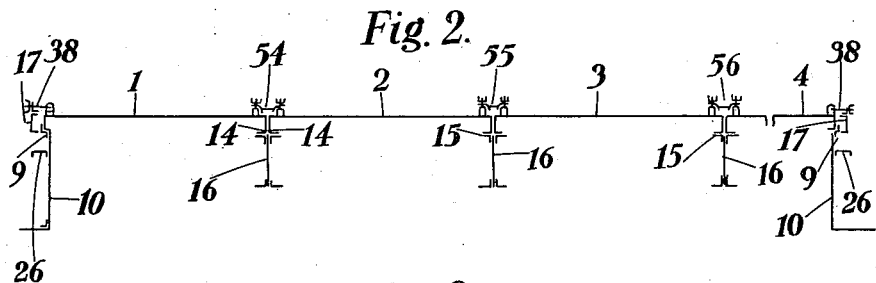
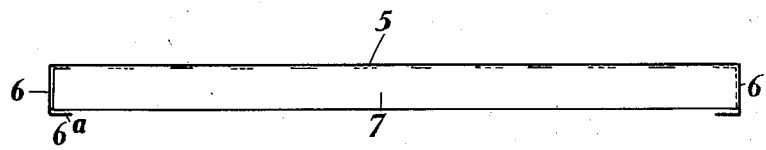

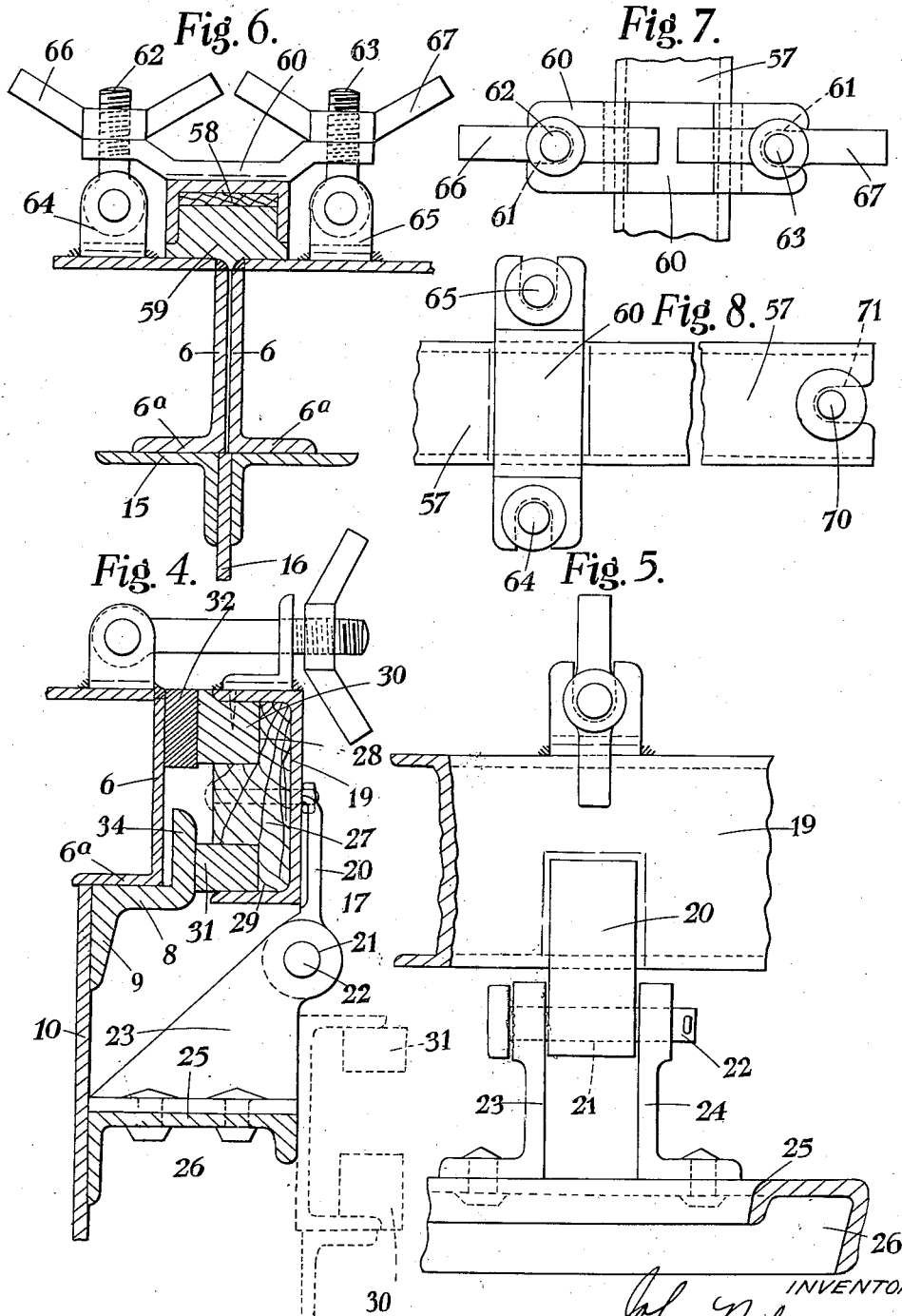

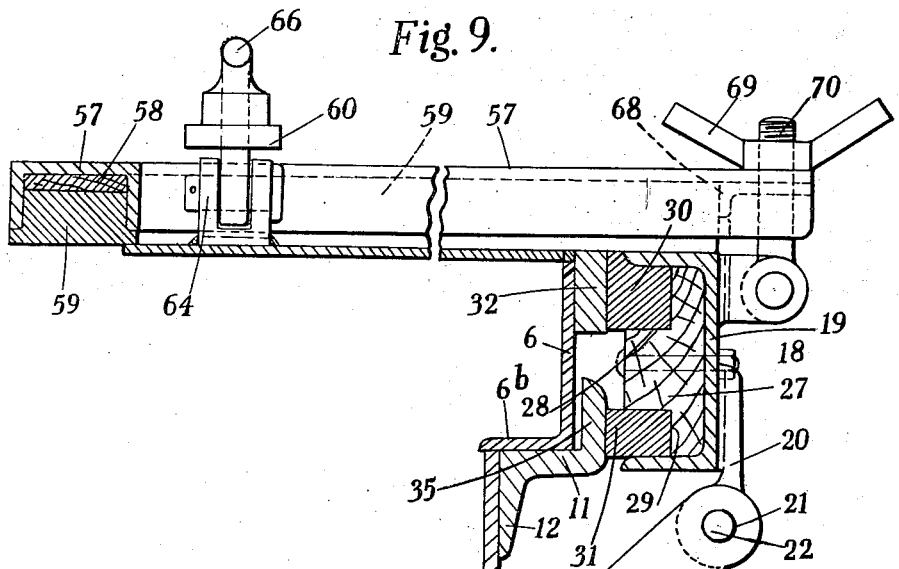
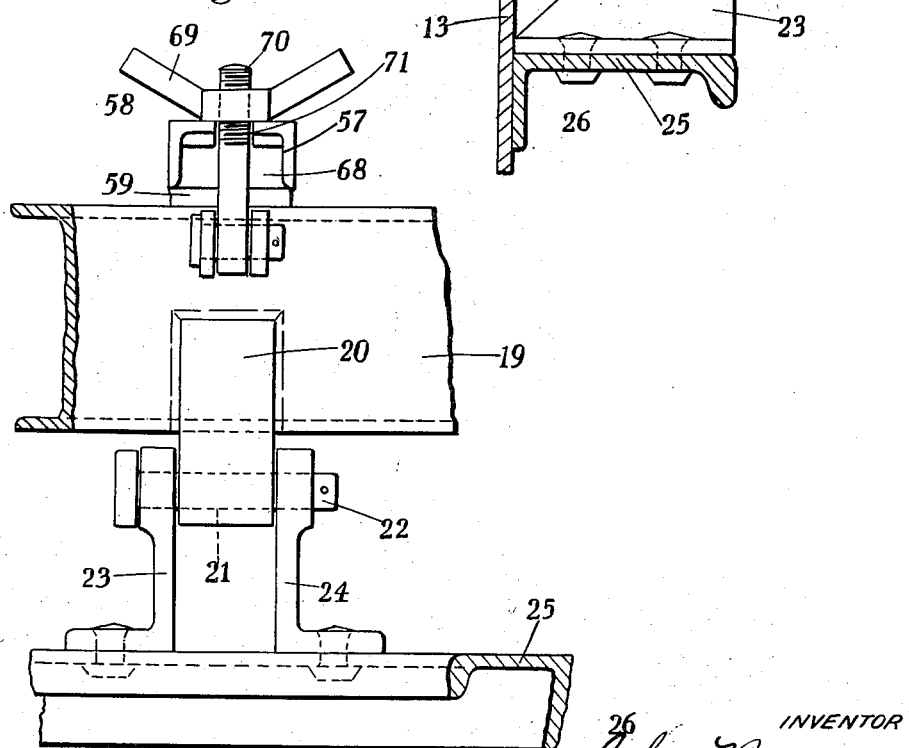

Sept. 14, 1937.　　　　　J. NELSON　　　　　2,093,362
COVER FOR SHIPS' HATCHES
Filed May 27, 1936　　　8 Sheets-Sheet 4

INVENTOR
John Nelson,
BY
Marks Appleman
ATTORNEY

Sept. 14, 1937.  J. NELSON  2,093,362
COVER FOR SHIPS' HATCHES
Filed May 27, 1936  8 Sheets-Sheet 5
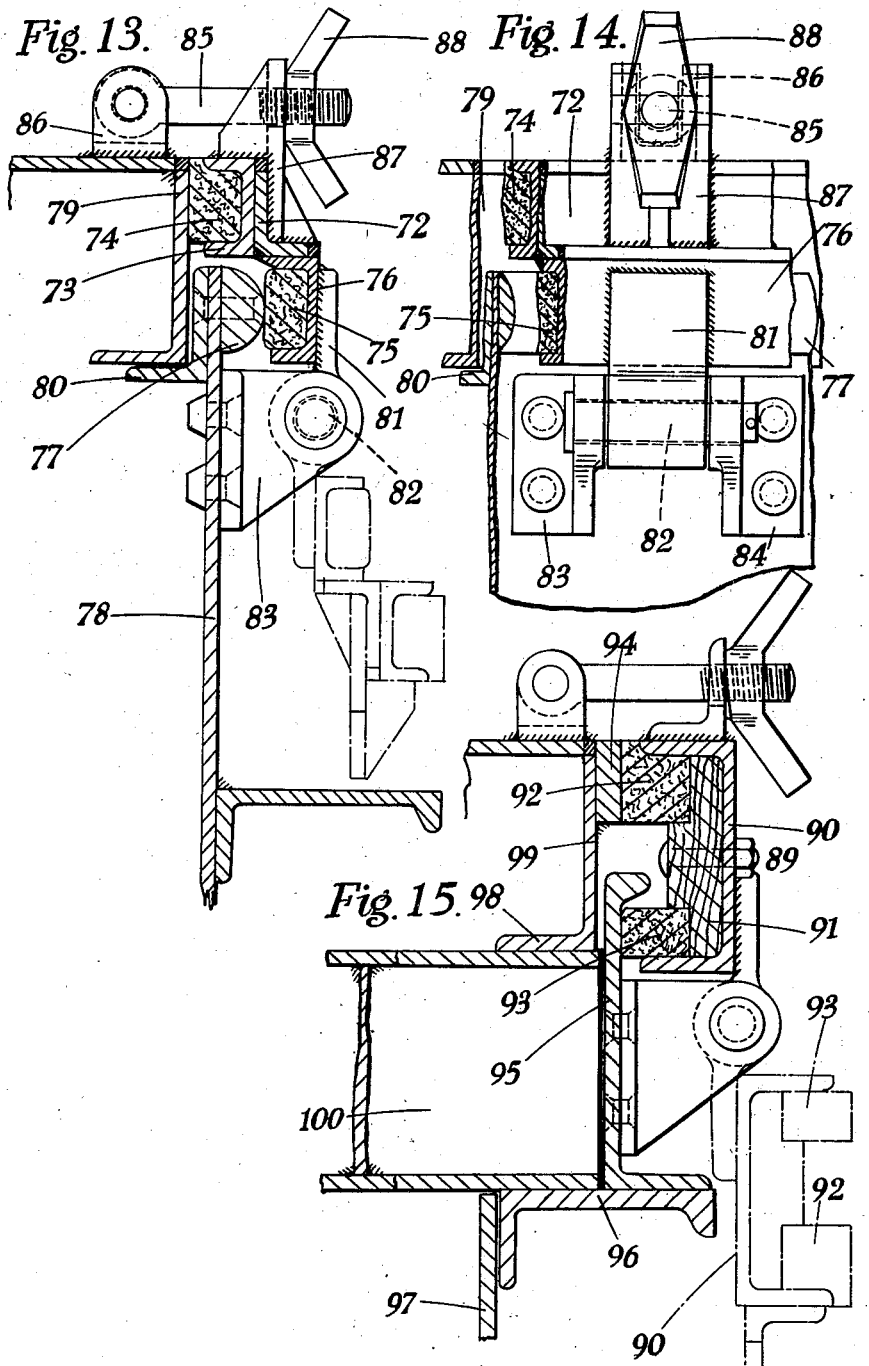

Sept. 14, 1937.  J. NELSON  2,093,362
COVER FOR SHIPS' HATCHES
Filed May 27, 1936   8 Sheets-Sheet 6

John Nelson INVENTOR
BY
Franch Appleman
ATTORNEY

Patented Sept. 14, 1937

2,093,362

UNITED STATES PATENT OFFICE 2,093,362

COVER FOR SHIPS' HATCHES

John Nelson, West Hartlepool, England

Application May 27, 1936, Serial No. 82,125
In Great Britain March 26, 1935

13 Claims. (Cl. 114—203)

This invention relates to covers for ships' hatches and particularly to steel hatch covers.

The usual wooden covers and tarpaulins have the disadvantage that they may be burst open by heavy seas and the holds flooded, thereby leading to the loss of the vessel or at least to the damaging of the cargo. Wooden hatch covers have the further disadvantage that repairs and maintenance and replacements of the covers and tarpaulins are frequent and most costly.

The principal object of this invention is to produce a hatch cover arrangement which is self sealing and thus obviate the use of tarpaulins or other loose coverings for effecting the watertight closure of the hatch.

Steel hatch covers are already known, and amongst other objects of this invention is the provision of an improved hatch cover arrangement which cannot be stove in by the heaviest of seas, which will positively prevent water percolating through to the hold, which will cost little in maintenance and repair, which can be quickly removed and replaced, and which can be readily fitted to existing hatch coamings with little alteration to the latter.

With the above and other objects in view, according to the present invention I provide a hatch cover arrangement, wherein joint-carrying shutter members cooperate with the hatch cover or covers and hold or assist in holding said cover or covers in position in or on the hatch coaming, said shutter members being attached or attachable to the coaming for movement relatively thereto into and out of their operative positions and carrying jointing material adapted to provide a continuous watertight joint with and around the hatch cover or covers when the shutter members are in their operative positions with the jointing material in intimate contact with the hatch cover or covers.

The above arrangement is suitable for a between decks construction but for a hatch not arranged between decks, said shutter member would carry jointing material adapted to provide continuous watertight joints with and around the hatch cover or covers and also with and around the hatch coaming when said shutter members are in their operative positions.

The hatch cover or covers may be held in position in or on the hatch coaming by shutter members, which are hinged to the sides and ends of the hatch coaming so as to be swingable towards and away from the cover or covers, each of said members being provided with jointing material adapted, when the shutter member is secured in its closed position, to form a watertight joint on the top or on the side (or end) of the hatch cover or covers and, if so required, also to form a watertight joint on the corresponding side (or end) of the hatch coaming or on a member secured thereto.

In order to force the said jointing material into intimate contact with its bearing surfaces and for securing the shutter members in their closed positions battening cleats or the like members are provided, which are pivoted or otherwise operatively connected to the hatch cover or covers (or to the shutter members) and are adapted to engage with members provided on the shutter members (or on the cover or covers), said battening means also comprising means for preventing movement of the shutter members relatively to the hatch cover or covers and thus for establishing and maintaining said watertight joints.

When the hatch is closed by two or more separate hatch covers, means are provided for sealing the joints between the abutting ends or sides, as the case may be, of adjacent covers. For example, said means may consist of one or more gaskets of jointing material carried by one or more members which extend across the top of the hatch covers and act as additional securing means for the latter.

In one construction, for instance, the or each of said members consists of a locking bar, which carries the gasket of jointing material and is arranged to be detachably secured both to the adjacent hatch covers and to the side or end shutter members. On the other hand, the means for sealing the joint or joints between the abutting sides or ends of adjacent hatch covers may consist of one or more gaskets of jointing material, which is or are carried on one or more detachable hatch web means, means being provided for forcing the lower edges of the abutting sides or ends of the adjacent hatch covers into watertight engagement with said gasket or gaskets.

Obviously, the shutter members may be constructed in many ways. For instance, each shutter member may comprise a channel bar which is hinged to the outside of the side (or end) of the hatch coaming and is provided with an upper gasket adapted to form a water-tight joint with the side or end of the hatch cover or covers or with a member or members secured thereto, and with a lower gasket, which is adapted to form a water-tight joint with the outside of the side or end of the hatch coaming or with a member secured thereto. In a modified construction, each shutter member comprises an upper and a lower channel bar, the former carrying the upper gasket and the latter the lower gasket.

In a further modification each of said shutter members comprises an angle bar, which is hinged to the outside of the hatch coaming and is provided with a gasket on one flange adapted to form a water-tight joint with the top of the hatch cover or covers, a further gasket, secured to the other flange of the angle bar, being adapted to form a water-tight joint with the side (or end) of the hatch coaming or with a member secured thereto.

It is convenient in certain constructions to arrange for two of the side (or end) shutters to overlap the hatch coaming at their ends, means being provided for forming water-tight joints between the abutting parts of all four shutter members.

As will be apparent, the invention is applicable to hatch cover arrangements comprising one or more hatch covers and said covers may be arranged either fore and aft or athwartships. The aforesaid locking bars may also be arranged fore and aft or athwartships. The hatch cover or covers is or are preferably provided with downwardly projecting flanges which seat upon rest bars or angles fixed inside the hatch coaming. The hatch cover or covers can also be stiffened by ribs.

In order to protect the shutter angles when the latter are in their inoperative positions, channel stiffeners can be secured to the hatch coaming plates and, by the provision of cleats, can also be utilized to support sides of the hatch covers, which can rest at their opposite sides on struts and thus form platforms for approach to the hatch.

Z-bars may be used in the construction of the shutter members. If a Z-bar is used, the upper gasket can be housed in a channel bar and the lower gasket between the horizontal flange of an angle, welded to the lower vertical flange of the Z-bar, and the horizontal flange of the latter or between the horizontal flange of the Z-bar and a flat bar welded to the lower vertical flange of the Z-bar.

In the case of the application of the invention to a hatch arranged between decks, jointing material will probably only be necessary on the horizontal flange of the shutter bar (if an angle shutter bar is used) or on the top vertical flange of the Z-bar or channel bar. In such constructions a bulb angle could be fixed to the hatch coaming and extend above the top edge of the hatch coaming, the bulb extending outwards. The hatch covers could then rest on inverted angles fixed to the inside of the hatch coaming, with the upper surfaces of their horizontal flanges flush or substantially flush with the top edge of the hatch coaming.

For inspection purposes and to give access to the hold when at sea, a manhole, provided with a watertight cover, may be fitted in the hatch cover or in one or more of the covers if there be more than one.

Various constructional forms of the invention are shown, by way of example on the accompanying sheets of drawings, whereon:—

Fig. 1 is a diagrammatic plan view of a hatch with the four hatch covers fitted thereon;

Fig. 2 is a diagrammatic vertical section through the centre of the hatch;

Fig. 3 is a diagrammatic vertical section through one of the hatch covers;

Fig. 4 is a vertical section through an end (or side) of the hatch coaming and through the shutter bar hinged thereto;

Fig. 5 is an outside elevation corresponding to Fig. 4;

Fig. 6 is a vertical section through the abutting ends of two adjacent hatch covers;

Fig. 7 is a fragmentary plan view corresponding to Fig. 6;

Fig. 8 is a fragmentary plan view of one end of one of the locking bars;

Fig. 9 is a vertical section through one of the sides of the hatch coaming and a shutter bar being shown in both elevation and transverse vertical section;

Fig. 10 is a fragmentary outside elevation corresponding to Fig. 9;

Fig. 13 is a vertical sectional elevation of a modified construction of shutter bar;

Fig. 14 is a front view with parts shown in vertical section corresponding to Fig. 13;

Fig. 15 is a vertical sectional elevation of a construction of shutter bar corresponding to that shown in Figs. 4 and 5 applied to a modified construction of hatch coaming;

Figure 11:
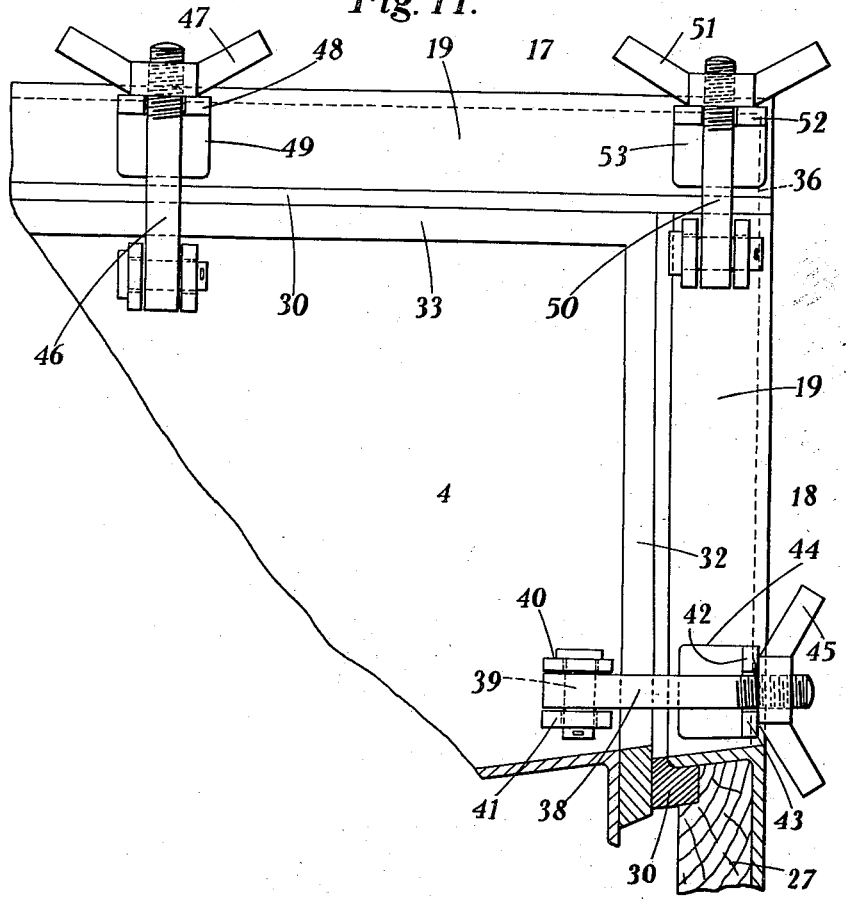
Fig. 11 is a plan view of one of the corners of the hatch "cover" and shutter with portions in vertical transverse section.

Referring first to Figs. 1 to 12:—

The constructional form of the invention shown in these figures, is applied to a hatch arranged to be closed by four steel hatch covers 1, 2, 3 and 4, Figs. 1 and 2, each comprising a cover plate 5, Fig. 3, welded at its sides and ends to angle bars 6 forming the sides and ends of the cover. The latter is stiffened by a number of fore and aft ribs 7 secured to the inside of the cover plate 5 by welding. The horizontal flanges 6ª of the angle bars 6 along the outermost ends of the two outermost covers are adapted to rest upon the upper surface of the web 8 of a Tysack-section-bar 9 secured upon the outer surface of the end hatch coaming plate 10, as shown more clearly in Fig. 4. The corresponding horizontal flanges 6ᵇ of the angle bars 6 along the sides of all the covers are adapted, as shown more clearly in Fig. 9, to rest upon the upper surfaces of the webs 11 of corresponding Tysack-section bars 12 secured upon the outer surfaces of the sides 13 of the hatch coaming. The horizontal flanges 6ª of the end angle bars 6 along the adjacent ends of the abutting covers rest upon the upper surfaces of the top flanges 15 of removable hatch web beams 16, as shown in Figs. 2 and 6.

To each of the ends of the hatch coaming there is pivoted a shutter bar 17, Fig. 4, a corresponding shutter bar 18, Fig. 9, being pivoted to each of the sides of the hatch coaming. Each of said shutter bars comprises a channel 19, which is hinged to the hatch coaming by means of a number of hinges, see Figs. 4, 5, 9 and 10. Each of said hinges comprises a hinge plate 20, which is secured by welding to the vertical web of the channel 19 and which is formed at its lower end with an eye 21 through which passes a headed pivot pin 22. The latter is supported in holes formed in two cheeks 23 and 24, the bases of which are riveted to the horizontal flange 25 of a bulb angle 26 welded to the hatch coaming 10.

Within each of the channels 19 there is secured a hard-wood filling 27 which is formed with upper and lower recesses 28 and 29 providing seatings respectively for gaskets 30 and 31. The latter may be of any suitable material but are preferably of jute or rubber. Flat bars 33, Fig. 4, are secured on the outside of the outer ends of the two outer hatch covers 1 and 4 and adjacent the upper edges thereof, corresponding bars 32 being secured along the port and starboard sides of all the hatch covers 1, 2, 3 and 4, see Figs. 9 and 11.

In the closed positions of the two end shutter members 17, therefore, the inner faces of the upper gaskets 30 are adapted to bear upon the outer faces of the plates 33 as shown in Figs. 4 and 11 and thus act to prevent water percolating through to the hold around the upper edges of the ends of the two end hatch covers 1 and 4. The lower gaskets 31 on the two end shutter members 17 bear on the vertical flanges 34 of the Tysack-section bars 8 secured on the ends of the hatch coaming, thereby preventing water entering the hold from the underside of the shutter member. In like manner, the upper gaskets 30 on the two shutter members 18 hinged along the port and starboard sides of the hatch coaming bear, in the closed position of said members, on the bars 32 secured along the sides of all four hatch covers, whilst the lower gaskets 31 bear against the vertical flanges 35 of the two Tysack-section bars secured to the port and starboard sides of the hatch coaming. The two gaskets on each of the port and starboard shutter members, therefore, act to prevent water entering the hold from above and below the shutter member as described above with reference to the gaskets in the two end shutter members.

Figure 12:
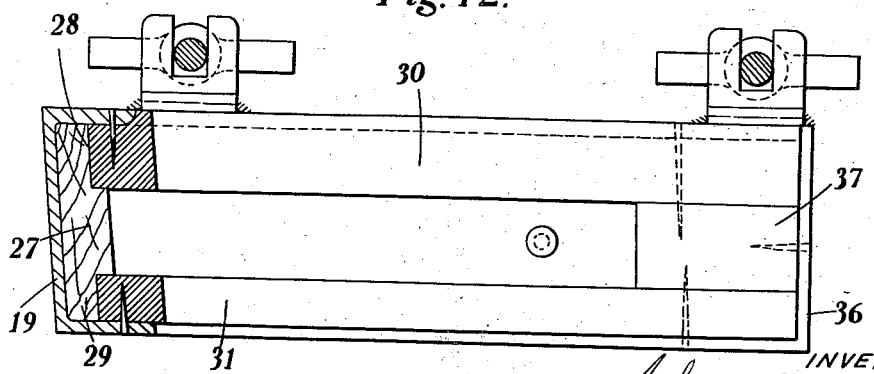
Fig. 12 is a fragmentary inside elevation and vertical section of the end of part of one of the shutter bars arranged along the ends of the hatch coaming.

As shown in Figs. 1 and 11, the shutter bars 18 hinged to the port and starboard sides of the hatch coaming are equal in length to the said sides, whilst the shutter bars 17 hinged to the ends of the hatch coaming extend beyond the outer edges of said ends by an amount at each end equal to the width of the shutter bar 18 hinged to the side of the hatch coaming. The ends of each of the shutter bars 17 hinged to the ends of the hatch coaming are box-ended as shown at 36 in Fig. 11. In order to ensure a water-tight joint between the ends of each of the shutter bars 18 hinged to the port and starboard sides of the hatch coaming and the adjacent parts of the adjacent shutter bars 17 hinged to the ends of the hatch coaming, a length of gasket 37 is secured at each of the overlapping ends of the last mentioned shutter bar between the upper and lower gaskets 30 and 31, as shown in Fig. 12.

For the purpose of securing the hatch covers in their battened-down positions and also for securing the port and starboard shutter-bars in their raised or operative positions, three toggles 38 are hinged in spaced relationship along the port and starboard sides of each of the hatch covers, each toggle being pivotally arranged upon a pivot pin 39, Fig. 11, which is supported in spaced lugs 40 and 41 welded to the top surface of the cover. The outer ends of each of said toggles is screw-threaded and is adapted to be received within a slot 42 formed in the vertical flange 43 of an angle lug 44 welded to the top flange of the shutter bar 18. Each of the toggles is provided with a wing nut 45 which, when screwed inwardly along the toggle, is adapted to bear upon the outer surface of the vertical flange 43 of the angle 44. Thus, when all the wing nuts 45 are tightened up the gaskets 30 and 31 are forced tightly into contact, respectively, with the bars 32 secured on the vertical sides of the hatch covers and with the upper vertical flanges 35 of the Tysack section bars which are secured to the sides of the hatch coaming.

Seven toggles 46, Fig. 1, are hinged to the top surface of each of the outer hatch covers 1 and 4 and are adjacent to the outer edges thereof, each toggle being provided with a wing nut 47, Fig. 11, adapted when screwed inwards to bear against the outer surface of the vertical flange 48 of an angle lug 49 welded to the top of the end shutter bar 17. Thus, when all the nuts 47 are tightened, the upper and lower gaskets on the end shutter bars 19 are pulled tightly into contact respectively with the bars 33 and the vertical flanges 34 of the Tysack-section bars.

In order to ensure that the abutting parts of the side and end shutter bars 19 shall be in water-tight relationship, a toggle 50, Figs. 1 and 11, is hinged at each end and to the top of each of the side shutter bars, each toggle being provided with a wing nut 51 which, when screwed up, bears against the outer surface of the vertical flange 52 of an angle lug 53 welded on the top of the channel 19 of the adjacent shutter bar 17.

Water is prevented from entering the hold through the spaces between the adjacent ends of the hatch covers by means comprising three locking bars 54, 55 and 56 extending athwartships across the hatch. Each locking member consists of an inverted channel 57, Figs. 6 to 10, within which is secured a length of hard wood packing 58 and a rubber or jute gasket 59. Toggle plates 60 are welded in spaced relationship upon the top of each of the channels 57 and each is provided with up-turned ends formed with slots 61 within which screw-threaded toggles 62 and 63, secured near to the contiguous ends of the adjacent hatch covers 1 and 2, or 2 and 3, or 3 and 4 are adapted to engage, said toggles being pivotally connected at their lower ends to brackets 64 and 65 welded to the tops of the adjacent hatch covers. As shown in Fig. 6, the gaskets 59 cover the spaces between the vertical ends of the adjacent hatch covers and when the wing nuts 66 and 67 on the toggles 62 and 63 are screwed up, the gaskets effectively prevent water entering the hold through the spaces between the hatch covers. The outer ends of the channels 57 are made box-ended as shown at 68 in Figs. 9 and 10 and the gaskets are pulled into intimate contact with the tops of the port and starboard shutter bars 19 by means of wing nuts 69 screwed onto toggles 70 pivotally mounted on the shutter bars and adapted to engage in slots 71, Fig. 8, formed in the outer ends of the locking bars.

From the above description, it will be appreciated that I have provided a hatch cover arrangement which, when battened down, positively prevents the entry of water into the hold. In order to remove the hatch covers, it is only necessary to remove the locking bars 54, 55 and 56, whereafter the four shutter members 19 can be swung down into their inoperative positions after the wing nuts on the toggles have been loosened.

In the modified construction shown in Figs. 13 and 14, each of the hinged shutter bars conveniently comprises an angle bar 72, a channel bar 73 being fixed to the vertical flange of each angle bar and receiving a joint or gasket 74 of suitable watertight material. The lower joint or gasket 75 is fitted in a channel 76 welded to the horizontal flange of the angle bar, said gasket bearing against a bar 77 fixed to the outer surface of the hatch coaming 78 and which may be of half-round section. Each hatch cover is provided with vertical side and end angle flanges 79, which rest upon angles 80 secured within the hatch coaming and of such a height that the cover extends well above the upper edges of the hatch coaming, the upper joints or gaskets 74 provided in the upper channels of the shutter bars being adapted, when in their operative positions, to bear against the vertical flanges of the angles 79. Thus, by the co-operation of the two joints or gaskets 74 and 75 on the shutter bars with the vertical flanges of the angles 79 on the covers and the half-round bars 77 respectively, water is prevented from entering the hatch through the spaces between the covers and the coaming either from the deck or from the hatch covering itself. The vertical flanges of the lower channels 76 are welded to hinge plates 81, which are pivotally mounted on the sides and ends of the hatch coaming by means of pivot pins 82 supported by spaced brackets 83 and 84 riveted to the sides and ends of the hatch coaming.

In order to hold the shutter bars in position and to produce the required tightening pressure on the gaskets 74 and 75, bolts 85 are pivotally connected to lugs 86 fixed on the upper surfaces of the covers, said bolts being adapted to pass through slots in vertical plates 87 fixed against and extending above the vertical flanges of the angle bars 72. Wing nuts 88, screwed upon the bolts, force the said plates, and thus the shutter bars, towards the sides or ends of the covers, thereby forcing the gaskets 74 and 75 into watertight contact with their bearing surfaces.

In the modification shown in Fig. 15, each shutter bar 89 comprises a channel 90, which, like the channels 17 and 18 of the construction shown in Figs. 1 to 12, is fitted with a length of hard wood 91 and an upper and lower gasket 92 and 93. In this construction, however, the upper gasket 92 seats against a flat plate 94 provided on the side, or end, of the hatch cover whilst the lower gasket 93 seats against the outer surface of a bulb angle 95, which is secured to another bulb angle 96 having its shorter flange secured, as by welding, to the hatch coaming 97. In the figure, the flange 98 of the side 99 of the hatch cover is shown resting upon the top flange of a hatch web beam 100. The turned-down position of the shutter bar is shown in broken lines in the figure.

Figure 16:
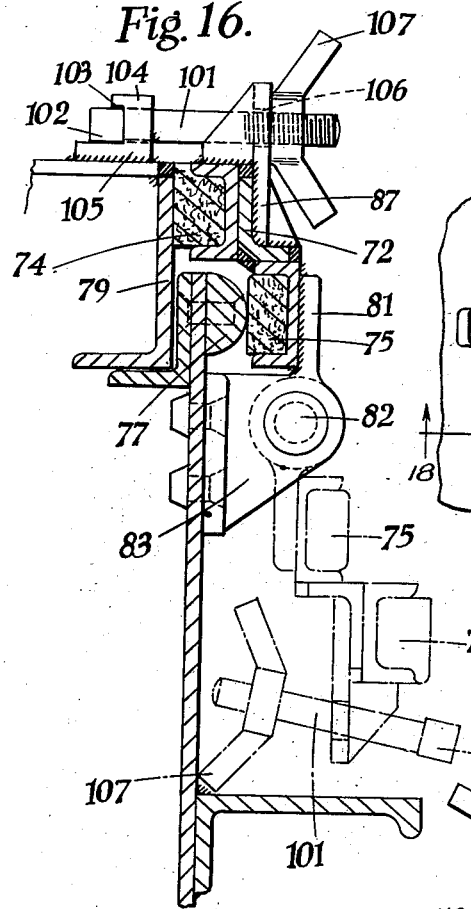
Fig. 16 is a transverse vertical section similar to Fig. 13 but showing a modified locking bolt.

The modification shown in Fig. 16 differs only from that shown in Figs. 13 and 14 in that instead of using pivoted bolts 85 for securing the shutter bar in its closed position, use is made of T-headed bolts 101. The heads 102 of the bolts are adapted to engage in recesses 103 formed on the inside of the parts 104 of lugs 105 which are arranged in pairs and in spaced relationship on the tops of the hatch covers, the shanks of the bolts projecting forwardly through holes 106 formed in the plates 87. Wing nuts 107 are screwed upon the bolts. In this construction, the bolts remain upon the shutter bars when the latter are swung downwards, as shown in broken lines.

Figure 17:
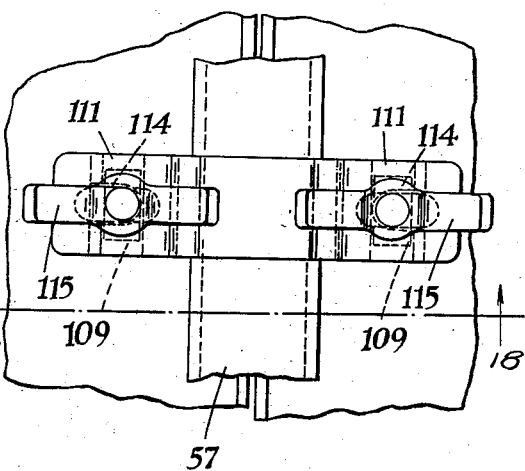
Fig. 17 is a plan view of a modified locking bolt for the locking bars.
Figure 18:
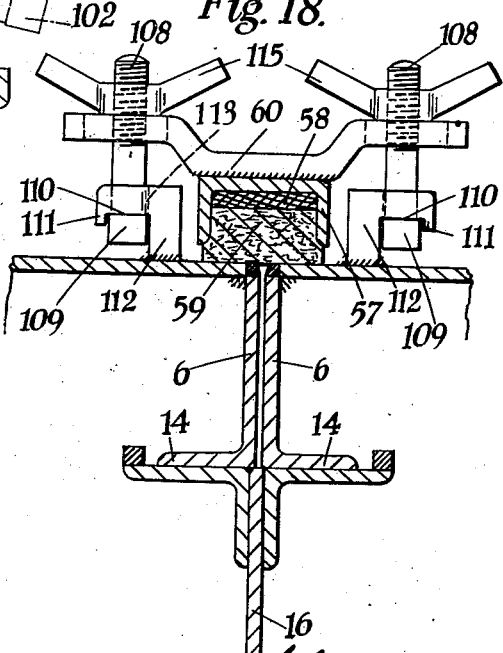
Fig. 18 is a transverse vertical section taken on the line 18—18 of Fig. 17.

Figs. 17 and 18 show the use of T-headed locking bolts 108 in conjunction with a locking bar 57 such as shown in Figs. 6 and 7. The heads 109 of the locking bolts engage in recesses 110 formed in the horizontal parts 111 of lugs 112 welded on the hatch covers, the shanks of the bolts passing through slots 113 forming in the parts 111 and also through slots 114 formed in the plate 60, being provided with wing nuts 115 adapted to be screwed upon their screwed outer ends.

The constructional form of the invention shown in Figs. 19 to 22 is applied to a hatch which is covered by seven separate steel hatch covers 116. In this particular construction, angle bars 117 are riveted on the inside of the sides and ends of the hatch coaming 118, the rivets 119 used for the securing of the vertical flanges of said angle bars serving also to secure flat bars 120 to the outside of the sides and ends of the hatch coaming. The upper edges of the vertical flanges of the angle bars 117 and of the said flat bars are flush with the upper edges of the hatch coaming plates. Each of the hatch covers comprises a rectangular steel plate 121 to each of the sides and ends of which is welded the top edge of the vertical flange of an angle bar 122, the shorter horizontal flange 123 of the latter extending inwards towards the centre of the hatch cover. When the hatch covers are in position in the hatch coaming, the horizontal flanges of the angle bars secured at the sides of the cover plates rest upon the horizontal flange of the said angle bars secured to the inside of the sides of the hatch coaming, whilst the horizontal flanges of the angle bars at the outer ends of the two end covers rest upon the horizontal flanges of the angle bars secured on the inside of the ends of the hatch coaming. The horizontal flanges 124 of the angle bars 125, Fig. 20, forming to the abutting ends of the adjacent hatch covers are supported upon removable hatch web beams 126, which are disposed in the usual manner athwartships of the hatch but differ from the usual hatch web beams in that each is provided with an inverted channel bar 127, the horizontal flange of which is welded to the upper horizontal flanges of the hatch web beam. The horizontal flanges 124 of the abutting ends of the adjacent hatch covers bear upon a basket 128 (of hemp, for example), which is arranged inside the vertical flanges 129 of the inverted channel bar.

It will be appreciated that the bearing of the lower surfaces of the horizontal flanges 124 of the abutting ends of the adjacent hatch covers upon the gaskets 128 provided in the inverted channel bars 127 provides watertight joints between the said abutting ends. It is necessary also to provide water-tight joints along the outer ends of the two end hatch covers and also along the sides of all the covers. This is arrived at in the following manner. A shutter member, Fig. 19, consisting of an angle bar 129, is pivoted along each side and each end of the hatch coaming. In the construction now being described, the vertical flanges 130 of the shutter angles arranged along the two sides of the hatch have five spaced hinge plates 131 secured to them, each of said hinge plates being pivoted upon a pin 132, which passes through a boss on the said hinge plate and through bosses 133 provided on the horizontal flange of a bracket 134 which is secured to the outside of the side hatch coaming plate 118. A rubber joint 135 is secured to the inside of the vertical flange of the shutter angle between upper and lower fastening strips 136 and 137 and a flat bar 138, extending the length of the said vertical flange, is arranged between the rubber joint and the inner surface of the vertical flange.

A rubber joint 139 is also fixed by spaced flat fastening strips 140 and 141 on the inside of the horizontal flanges 142 of the two side shutter angles, flat bars 143 also being arranged between the rubber joints and the horizontal flanges.

The shutter angles hinged to the ends of the hatch coaming are identical in construction with the shutter angles hinged to the sides of the hatch coaming and, therefore, need no further description except that they are pivoted by four hinges, such as described above, to the ends of the hatch coaming.

If so desired, the hatch covers can be strengthened by continuous flat bars 144 welded to the underside of the covers and extending fore and aft, said bars being interconnected by intercostal bars also welded to the undersides of the covers and extending athwartships thereof.

Figure 21:
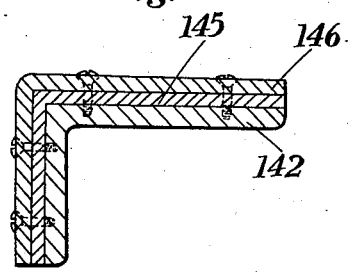
Figure 22:
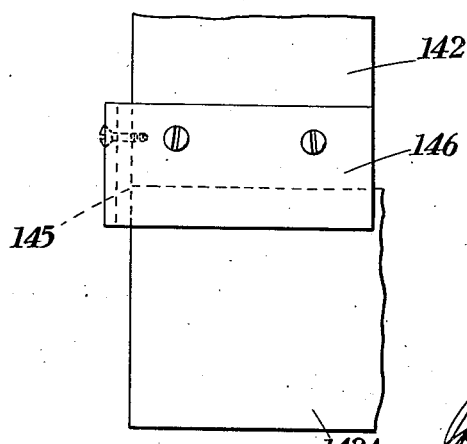

The two fore and aft shutter angles are equal in length to the length of the sides of the hatch coaming, so that, as shown in Figs. 21 and 22, the ends of the horizontal flanges 142 of the shutter angles hinged to the ends of the hatch coaming abut against the edges of the horizontal flanges 142A of the fore and aft shutter angles. In order to seal the joints between the flanges of the fore and aft and athwartships shutter angles, a rubber joint 145 is arranged in way of each joint and is secured to the horizontal flange of the end shutter angle beneath a flanged plate 146, the latter and the rubber joint being arranged to overlap the abutting parts of the two adjacent flanges.

Figure 19:
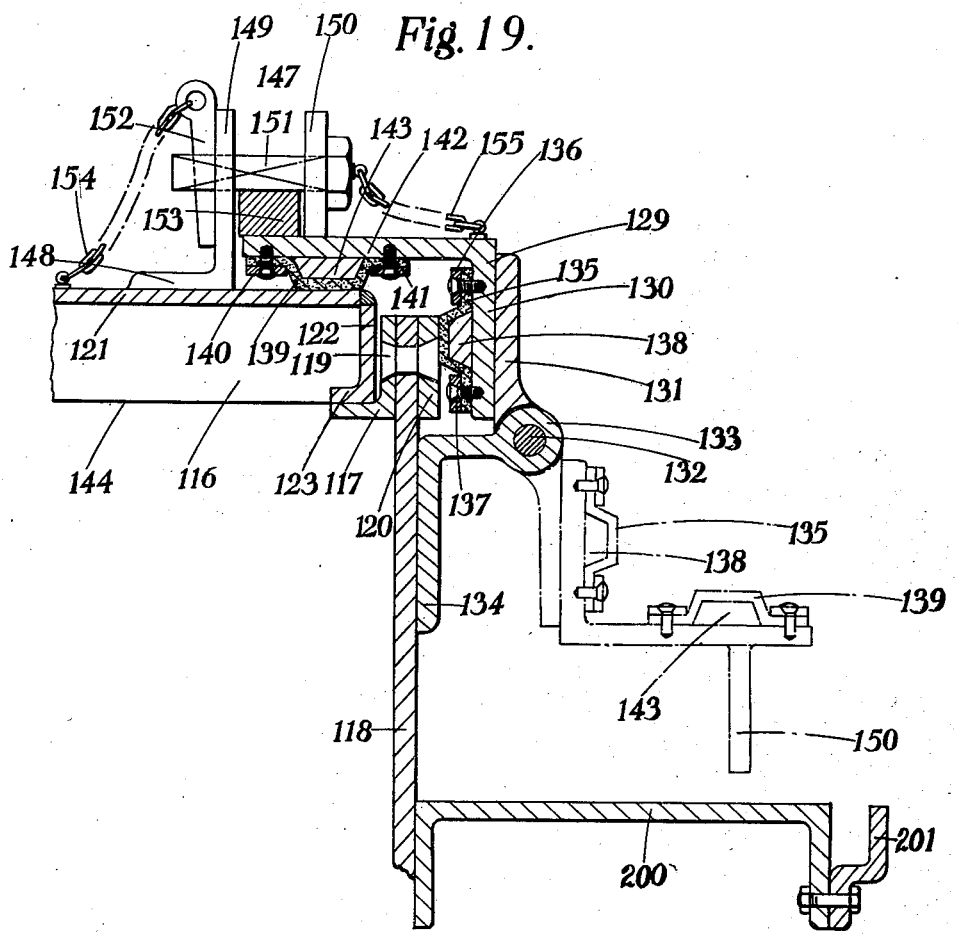
Figs. 19 to 22 are views of details of another modified form of hatch cover battening arrangement.
Figure 20:
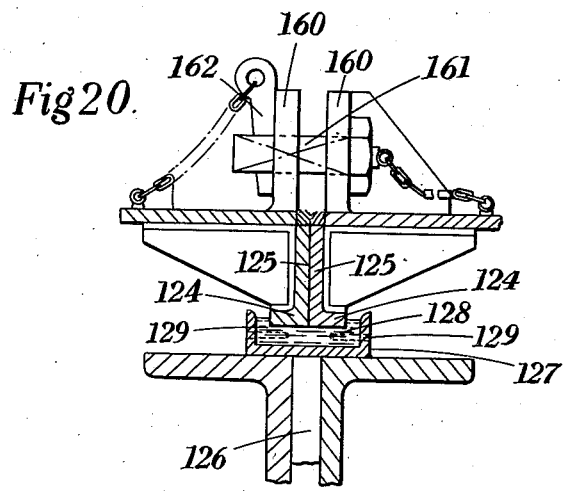

The rubber joints 135, Fig. 19, provided on the vertical flanges 130 of the side shutter angles are adapted to bear against the flat bars 120 secured to the sides of the hatch coaming 118 and the corresponding rubber joints on the vertical flanges of the end shutter angles are adapted to bear against the flat bars secured to the ends of the hatch coaming. The rubber joints 139 on the horizontal flanges 142 of all the shutter angles are arranged to bear upon the upper surfaces of the hatch covers 116. Battening cleats 147 are provided for forcing the rubber joints into watertight contact with the said flat bars and the tops of the covers respectively, each of said cleats comprising an angle lug 148 which is welded to the top of the cover with its vertical flange 149 adjacent to the edge of the horizontal flange 142 of the shutter angle. A vertical plate 150 is welded to the horizontal flange of the shutter angle opposite the vertical flange of the said angle lug and is set back slightly from the edge of said flange. A square bolt 151 is passed through square holes in the said vertical flange 149 and plate 150 and is secured in position by a tapered cotter 152 driven through a hole formed in the bolt. A steel cotter pin, or wooden wedge 153, is then driven between the said bolt and the top of the shutter angle, whereby the two rubber joints on the latter are forced against the top of the hatch cover and the flat bar, respectively. The tapered cotter and the steel cotter pin are anchored to the hatch cover and the shutter angle, respectively, by lengths of chain 154 and 155 welded to these members.

As an alternative to this arrangement, the square bolt may be threaded at one end and secured by means of a nut screwed upon it.

In order to protect the shutter angles 129 when the latter are hinged outwards, inverted channel stiffeners 200 are fixed along the sides and ends of the hatch coaming 118, the webs of the stiffeners projecting outwards beyond the swung-down shutter angles. The channel stiffeners can also be used to support the hatch covers, which then act as platforms providing approach to the hatch. To this end, cleats 201 are secured to the outermost vertical flanges of the stiffeners and are adapted to support the side flanges of the hatch covers, the opposite side flanges of which will rest upon struts.

In order to bring the abutting ends of the adjacent hatch covers into intimate contact, the following arrangement is adopted. At both ends of the end of each of said adjacent covers an angle lug 160 is welded with both its flanges vertical, one of said flanges being parallel and adjacent to the end of the cover to which the lug is welded. The shank of a bolt 161 is passed through holes formed in the opposite vertical flanges of the two angle lugs 160 and is secured in position by means of a cotter pin 162 which is driven into a slot formed in the bolt and bears against one of said flanges. In this manner, the ends of the adjacent covers are forced into intimate contact, and even although water should percolate through the joints it will be prevented from entering the hold by reason of the flanges 124 on the ends of the abutting hatch covers bearing upon the hemp joints 128 in the channels 127 on the hatch web beams 126.

The hatch covers are also held down by means of three locking bars (not shown) each of which extends fore and aft across the hatch covers.

It will be well understood from the above description that the improvements described above can be readily and easily applied to existing hatch coamings without substantial alteration of the latter.

I claim:

1. A hatch cover arrangement comprising at least one hatch cover and hatch coaming therefor, depending side and end flanges formed on said cover, a rigid and continuous shutter member hingedly connected to each side and end of said coaming so as to be swingable towards and away from said cover, a plurality of longitudinally disposed gaskets on each shutter, said gaskets being engageable with portions of said coaming and also with said flanges of said cover to form water-tight joints therewith, means on said cover for securing said shutters thereto in clamping relation to both said coaming and said cover, and the end portions of said gaskets carried by said shutters on the sides of said coaming being formed to cooperate with end portions of said gaskets carried by said shutters on the ends of said coaming to make said water-tight joints continuous.

2. A hatch cover arrangement comprising at least one hatch cover, and a hatch coaming therefor, depending side and end flanges formed on said cover, a rigid and continuous member hingedly carried by each side and end of said coaming, said members being engageable with said cover to hold said cover upon said coaming, a longitudinally disposed continuous gasket carried by each of said members and engageable with said flanges to form a continuous water-tight joint therewith, a second longitudinally disposed continuous gasket carried by each of said members and engageable with said sides and ends of said coaming to form a continuous water-tight joint therewith and the end portions of both of said gaskets carried by said members on the sides of said coaming being formed to cooperate with the end portions of said gaskets carried by said members on the ends of said coaming to make said water-tight joints continuous.

3. The structure of claim 1, each of said shutter members comprising a channel bar, said gaskets carried inwardly of the flanges of said channel bar, means carried by said channel bar and spacing said gaskets apart, a Z-bar carried by said coaming, the flanges of said Z-bar being vertical and the web thereof horizontal, said web comprising means seating the lower edges of said flanges of said cover, and said gasket forming said joint with the sides and ends of said coaming being engageable with the outer vertical flange of said Z-bar.

4. The structure of claim 1, said means for securing said shutters to said cover comprising battening cleats, said cleats being removably and operatively connected to said cover, members carried by said shutters and engageable with said cleats, said battening cleats including also means for preventing movement of said shutters relative to said cover.

5. A hatch cover arrangement comprising at least two separate hatch covers, said covers being adapted to be supported by the hatch coaming in abutting relation to close said hatch, said covers having depending side and end flanges, means for holding said covers on said coaming, said means including rigid and continuous swingable shutter members carried by the sides and ends of said coaming and engageable with said coaming and said flanges to form a pair of spaced water-tight joints therewith, the end portions of the shutters carried by the sides of said coaming being formed to cooperate with the ends of said shutters carried by the ends of said coaming whereby to make said joints continuous, means carried by said covers and engageable with said shutters to secure the same in clamping relation to said flanges and coaming, means for sealing the joint between abutting flanges of said covers, said means comprising a locking bar removably attached to both of said covers, joint sealing means carried by said bar, and said bar having means formed thereon for seating additional means for clamping said bar to said abutting covers.

6. The structure of claim 5, and said means formed on said bar comprising a plurality of spaced toggle plates having slotted ends for receiving threaded toggles carried by said abutting covers, wing nuts threaded on said toggles for engaging the ends of said toggle plates, and said toggles and wing nuts comprising said means for clamping said bar to said abutting covers.

7. The structure of claim 1, each of said shutter members comprising a channel bar, said gaskets being carried inwardly of the flanges of said bar, and means carried by said channel bar and spacing said gaskets apart.

8. The structure of claim 1, each shutter member comprising an upper and a lower channel bar, one of said gaskets being carried by said upper bar and adapted to engage a flange of said cover, and the other of said gaskets being carried by said lower bar and adapted to engage a portion of said coaming.

9. The structure of claim 1, each shutter member comprising an upper and a lower channel bar, one of said gaskets being carried by said upper bar and adapted to engage a flange of said cover, the other of said gaskets being carried by said lower bar and adapted to engage a portion of said coaming, an angle bar, said upper and lower channel bars being secured to the flanges of said angle bar, and said lower channel bar being swingably connected to said coaming.

10. The structure of claim 1, a circumferential bead around said coaming, each shutter member comprising an upper and a lower channel bar, one of said gaskets being carried by said upper bar and adapted to engage a flange of said cover, the other of said gaskets being carried by said lower bar and adapted to engage said bead of said coaming.

11. The structure of claim 1, each shutter member comprising an upper and a lower channel bar, one of said gaskets being seated in the channel of each of said channel bars, said gasket carried by said upper bar being adapted to engage said cover flange, and said lower gasket being adapted to engage a portion of said coaming.

12. A hatch cover arrangement comprising at least one hatch cover, and a hatch coaming therefor, depending side and end flanges formed on said cover, a rigid and continuous member hingedly carried by each side and end of said coaming, said members being engageable with said cover to hold said cover upon said coaming, a longitudinally disposed continuous gasket carried by each of said members and engageable with said flanges to form a continuous water-tight joint therewith, said members on the sides of said coaming being formed to cooperate with the end portions of said gaskets carried by said members on the ends of said coaming to make said water-tight joint continuous.

13. A hatch cover arrangement comprising at least one hatch cover and a hatch coaming therefor, cooperating means carried by both said cover and coaming for seating said cover on said coaming, a rigid and continuous member hingedly carried by each side and end of said coaming, said members being swingable into and out of engagement with said cover, means for detachably connecting said members to said cover to maintain said cover on said coaming, means carried by each of said members and engageable with said cover to form continuous water-tight joints with the ends and sides thereof, and portions of said last named means carried by each member being adapted to cooperate with portions of said like means carried by the next adjacent members to continue said joints unbroken entirely around said cover.

JOHN NELSON.